US009671867B2

(12) United States Patent
Bachfischer et al.

(10) Patent No.: US 9,671,867 B2
(45) Date of Patent: Jun. 6, 2017

(54) INTERACTIVE CONTROL DEVICE AND METHOD FOR OPERATING THE INTERACTIVE CONTROL DEVICE

(75) Inventors: Katharina Bachfischer, Düsseldorf (DE); Christoph Waeller, Braunschweig (DE); Volkmar Wagner, Berlin (DE); Rainer Dehmann, Berlin (DE)

(73) Assignee: VOLKSWAGEN AG, Wolfsburg (DE)

( * ) Notice: Subject to any disclaimer, the term of this patent is extended or adjusted under 35 U.S.C. 154(b) by 816 days.

(21) Appl. No.: 12/294,022

(22) PCT Filed: Mar. 22, 2007

(86) PCT No.: PCT/EP2007/002553
§ 371 (c)(1),
(2), (4) Date: Apr. 21, 2009

(87) PCT Pub. No.: WO2007/107368
PCT Pub. Date: Sep. 27, 2007

(65) Prior Publication Data
US 2009/0327977 A1    Dec. 31, 2009

(30) Foreign Application Priority Data

Mar. 22, 2006  (DE) .................. 10 2006 013 067
Mar. 27, 2006  (DE) .................. 10 2006 014 426
Aug. 2, 2006   (DE) .................. 10 2006 037 156

(51) Int. Cl.
*G06F 3/01*       (2006.01)
*B60K 35/00*    (2006.01)
(Continued)

(52) U.S. Cl.
CPC .............. *G06F 3/017* (2013.01); *B60K 35/00* (2013.01); *B60K 37/00* (2013.01); *B60K 37/02* (2013.01);
(Continued)

(58) Field of Classification Search
CPC ........ G06F 3/017; G06F 3/048; G06F 3/0488; G06F 3/033
(Continued)

(56) References Cited

U.S. PATENT DOCUMENTS 4,761,641  A  *  8/1988  Schreiber ................. H04N 9/12
                                                      340/815.42
5,579,037  A     11/1996  Tahara et al.
(Continued)

FOREIGN PATENT DOCUMENTS

CN        100542848       9/2009
DE        195 29 571      2/1997
(Continued)

OTHER PUBLICATIONS

International Preliminary Report on Patentability and Written Opinion, PCT/EP2007/002553, dated Dec. 3, 2008 (Translated).
(Continued)

*Primary Examiner* — David Choi
(74) *Attorney, Agent, or Firm* — Andrews Kurth Kenyon LLP

(57) ABSTRACT

An interactive control device includes a display device, and a method is for operating the interactive control device. The method includes: displaying graphical information on the display device; receiving sensor information; activating a control action if on the basis of the sensor information it is ascertained that a body part of a user is located within an activation region that is spatially defined relative to a display region of a control element on the display device with which the control action is associated; the received sensor information including user information that is evaluated prior to an activation of the control action in order to ascertain a control intention for the at least one control element; and the information represented on the display device being adapted (Continued)

as a function of the ascertained control intention such that the at least one control element is represented in a manner optimized for the activation of the control action associated with the control element. The control device may be arranged as a component of a motor vehicle console so as to be able to implement the control method.

27 Claims, 16 Drawing Sheets

(51) Int. Cl.
| | | |
|---|---|---|
| B60K 37/00 | (2006.01) | |
| B60K 37/02 | (2006.01) | |
| B60K 37/06 | (2006.01) | |
| G06F 3/0481 | (2013.01) | |
| G06F 3/0488 | (2013.01) | |
| B60R 11/02 | (2006.01) | |
| B60W 50/10 | (2012.01) | |

(52) U.S. Cl.
CPC .......... B60K 37/06 (2013.01); G06F 3/04812 (2013.01); G06F 3/04883 (2013.01); B60K 2350/1012 (2013.01); B60K 2350/1024 (2013.01); B60K 2350/1028 (2013.01); B60K 2350/901 (2013.01); B60K 2350/903 (2013.01); B60R 11/0235 (2013.01); B60R 11/0264 (2013.01); B60W 50/10 (2013.01); G06F 2203/04108 (2013.01)

(58) Field of Classification Search
USPC ................................ 715/863, 205; 345/1.3, 7
See application file for complete search history.

(56) References Cited

U.S. PATENT DOCUMENTS

| | | | | |
|---|---|---|---|---|
| 5,829,782 | A * | 11/1998 | Breed ................... | B60N 2/002 180/272 |
| 6,021,418 | A * | 2/2000 | Brandt ................. | G06F 9/4443 709/203 |
| 6,040,824 | A * | 3/2000 | Maekawa .......... | G01C 21/3614 345/173 |
| 6,115,668 | A * | 9/2000 | Kaneko ................... | G01C 21/28 340/988 |
| 6,137,487 | A * | 10/2000 | Mantha ................. | G06F 3/0481 715/767 |
| 6,256,558 | B1 | 7/2001 | Sugiura et al. | |
| 6,259,436 | B1 * | 7/2001 | Moon ................... | G06F 3/0488 345/173 |
| 6,279,946 | B1 * | 8/2001 | Johnson ............ | B60R 21/01526 280/735 |
| 6,363,160 | B1 | 3/2002 | Bradski et al. | |
| 6,426,761 | B1 * | 7/2002 | Kanevsky ............ | G06F 3/0481 715/764 |
| 6,498,628 | B2 * | 12/2002 | Iwamura ................ | G08C 23/00 345/157 |
| 6,675,075 | B1 | 1/2004 | Engelsberg et al. | |
| 6,741,266 | B1 * | 5/2004 | Kamiwada ............ | G06F 3/0481 345/640 |
| 7,493,312 | B2 * | 2/2009 | Liu ................... | G06F 17/30017 |
| 7,697,827 | B2 * | 4/2010 | Konicek ................ | G03B 17/02 348/211.1 |
| 7,890,862 | B2 * | 2/2011 | Kompe ................... | G06F 3/016 715/701 |
| 7,920,102 | B2 * | 4/2011 | Breed ................... | B60K 35/00 340/991 |
| 8,042,044 | B2 * | 10/2011 | Van Leeuwen ..... | G06F 3/04842 345/157 |
| 8,117,623 | B1 * | 2/2012 | Malasky ................. | G06F 9/543 715/727 |
| 8,543,906 | B2 * | 9/2013 | Chidlovskii ........ | G06F 17/2247 715/234 |
| 2001/0020777 | A1 * | 9/2001 | Johnson ............ | B60R 21/01536 280/735 |
| 2004/0046736 | A1 * | 3/2004 | Pryor ...................... | A63F 13/02 345/156 |
| 2004/0054358 | A1 * | 3/2004 | Cox ..................... | A61F 9/00806 606/5 |
| 2004/0254699 | A1 * | 12/2004 | Inomae .................. | B60K 37/02 701/36 |
| 2005/0063564 | A1 | 3/2005 | Yamamoto et al. | |
| 2005/0184959 | A1 * | 8/2005 | Kompe .................. | G06F 3/016 345/163 |
| 2005/0212765 | A1 | 9/2005 | Ogino | |
| 2005/0243054 | A1 * | 11/2005 | Beymer ............... | A61B 3/0033 345/156 |
| 2005/0267676 | A1 * | 12/2005 | Nezu ...................... | B60K 35/00 701/532 |
| 2005/0275632 | A1 * | 12/2005 | Pu ....................... | G01C 21/3611 345/171 |
| 2006/0005629 | A1 * | 1/2006 | Tokunaga .............. | G01C 19/56 73/760 |
| 2006/0136846 | A1 * | 6/2006 | Im ........................... | G06F 3/017 715/863 |
| 2006/0161846 | A1 * | 7/2006 | Van Leeuwen ..... | G06F 3/04842 715/702 |
| 2006/0232551 | A1 * | 10/2006 | Matta ..................... | G06F 1/1626 345/156 |
| 2006/0261672 | A1 | 11/2006 | Richter | |
| 2007/0046641 | A1 * | 3/2007 | Lim .................... | G06F 3/04886 345/173 |
| 2007/0057781 | A1 * | 3/2007 | Breed ..................... | B60K 35/00 340/457.1 |
| 2007/0086764 | A1 * | 4/2007 | Konicek ................ | G03B 17/02 396/56 |
| 2007/0262965 | A1 * | 11/2007 | Hirai ................... | B60R 11/0235 345/173 |
| 2008/0005703 | A1 * | 1/2008 | Radivojevic .......... | G06F 1/1626 715/863 |
| 2008/0284799 | A1 * | 11/2008 | Hollemans .......... | G06F 3/04842 345/660 |
| 2008/0288895 | A1 * | 11/2008 | Hollemans .............. | G06F 3/041 715/863 |
| 2009/0240426 | A1 * | 9/2009 | Akita ................. | G01C 21/3647 701/533 |
| 2009/0327977 | A1 * | 12/2009 | Bachfischer ........... | B60K 35/00 715/863 |
| 2011/0109745 | A1 * | 5/2011 | Nakatani ................ | G01C 21/26 348/148 |
| 2011/0115647 | A1 * | 5/2011 | Mukaiyama ........ | G08G 1/09623 340/907 |

FOREIGN PATENT DOCUMENTS

| | | |
|---|---|---|
| DE | 198 29 568 | 1/2000 |
| DE | 100 22 321 | 11/2001 |
| DE | 10 2004 038 965 | 3/2005 |
| DE | 10 2004 045 885 | 3/2006 |
| JP | 2-153415 | 6/1990 |
| JP | 06-321011 | 11/1994 |
| JP | 7-072792 | 3/1995 |
| JP | 10-24785 | 1/1998 |
| JP | 10024785 | * 1/1998 |
| JP | 10-269022 | 10/1998 |
| JP | 11-198745 | 7/1999 |
| JP | 2002-358162 | 12/2002 |
| JP | 2004-303000 | 10/2004 |
| JP | 2004-334590 | 11/2004 |
| JP | 2005-004410 | 1/2005 |
| JP | 2006-031499 | 2/2006 |
| JP | 2006-039953 | 2/2006 |
| RU | 2220057 | 5/2003 |
| WO | WO 00/75766 | 12/2000 |
| WO | WO 01/29640 | 4/2001 |
| WO | WO 02/29640 | 4/2002 |
| WO | WO 2004/051392 | 6/2004 |

(56) References Cited

FOREIGN PATENT DOCUMENTS

| WO | WO 2004/078536 | 9/2004 |
| WO | 2006/003591 | 1/2006 |
| WO | WO 2006/003588 | 1/2006 |

OTHER PUBLICATIONS

International Search Report, PCT/EP2007/002553, dated Jul. 9, 2007.

* cited by examiner

INTERACTIVE CONTROL DEVICE AND METHOD FOR OPERATING THE INTERACTIVE CONTROL DEVICE

FIELD OF THE INVENTION

The present invention relates to a method for operating an interactive control device having a display device and a control device having a display device.

BACKGROUND INFORMATION

Automotive applications in a motor vehicle cockpit are often controlled via so-called interactive control devices. An interactive control device includes a display device on which one or more control elements are graphically represented. The individual automotive applications are assigned to the control elements. An action, called a control action in the following, is activated or triggered in that the user moves a body part, for example a finger of a hand, toward the graphical representation of the control element. It depends on the design of a sensor unit of the control device whether, in order to activate the control action associated with the control element, the body part must touch a sensor unit (e.g. a touch-sensitive film) situated in front of the display device or integrated into it, or whether it suffices to approach the respective control element to within a certain distance.

Interactive control devices in which touch is required in order to trigger the control action are called touch screen control devices. Interactive control devices that may be activated without touch include for example sensors that are able to detect high-frequency signals that are transmitted via the human body. For this purpose it is necessary for a high-frequency transmitter to be situated near the body or in contact with the body. In a motor vehicle, such a high-frequency transmitter may be integrated into the vehicle seat, for example. Methods and devices for transmitting information using high-frequency signals via a human body are described for example in PCT International Published Patent Application No. WO 2004/078536.

The region in which the body part must be located in order to activate the control action is called the activation region. In a touch screen control device, the activation region is a two-dimensional area on the surface of the touch screen control device. The activation area normally coincides with the display area of the control element to be operated. In a control device that is controllable in a contactless manner, the activation region is normally a three-dimensional region in close proximity above or adjacent to the surface of the display device. A projection of the activation region along a surface normal of the surface of the display device onto the display device is normally congruent with the display area of the associated control element.

The representation of information on the display devices of such interactive control devices is directed in certain conventional arrangements not at the resolution capacity of the human eye, but primarily at an accuracy of aim and a motoric precision of the human fingers of users.

Control elements represented on a display device, which are also called virtual control elements, include menus, buttons, etc. They may also assume the shape of graphical objects, however, in interactively designed navigation maps, for example. Generally, such virtual control elements are also called widgets. Nowadays, the control elements on interactive control devices are generally quite large so that a user is able to activate them comfortably and easily using his fingers. As a consequence, the display regions of the control elements often cover a considerable part of the display area of the display device, which could otherwise be used for additional information. Frequently, the display regions cover graphical information "behind" them. If the representation of the control elements on the display device is rendered smaller, then one obtains space for representing information, but an ease of operation is reduced since it is considerably more difficult to "hit" the control elements using one's finger.

It is conventional to scale the scaling of the control elements in response to a first control action. In such control devices, at least two control operations are required in order to activate and perform a desired control action.

U.S. Pat. No. 5,579,037 describes a display device having an electromagnetic digitizing tablet, by which Japanese characters, which are represented on the display device, may be entered. The digitizing tablet includes a stylus connected to the digitizing tablet by a wire. If the stylus is brought to a first distance with respect to the display device, then a displayed region around the position, over which the stylus is located, is displayed in a magnified manner. As long as the distance of the stylus from the display device is smaller than the first distance and greater than a second distance, which is smaller than the first distance, the magnified region is adapted to a change in position of the stylus in parallel to the display device. If the second distance is undershot, then the magnified region is no longer adapted as a function of the movement parallel to the display surface such that it is possible to enter one of several magnified characters by touching the display device at the location at which the corresponding magnified character is displayed. Such a control device, which can only be operated by a stylus, is not suited for many applications such as an interactive control device in a motor vehicle cockpit, for example. Furthermore, in a moving vehicle, it is difficult to move a stylus at a predefined distance parallel in front of the display device in order to have the correct detail magnified.

German Published Patent Application No. 10 2004 045 885 describes a control element, which preferably takes the form of a turn-push-pull knob, for a motor vehicle for controlling a function of the motor vehicle, in particular by pushing on the control element, touching the control element, turning the control element and/or pulling the control element, the control element having assigned to it a lighting device for illuminating the control element, an approach sensor for detecting an approach of an operator of the control element and a lighting controller for adjusting the illumination of the control element as a function of an output signal of the approach sensor.

Therefore, an interactive control device is desirable, which on the one hand respectively allows for an optimal representation of information, while at the same time offering a great ease of operation in that control elements are readily activated.

SUMMARY

Example embodiments of the present invention provide a control device and a method for operating an interactive control device, which allow both for an optimal communication of information adapted to the human eye and at the same time a comfortable activation of control elements.

Example embodiments of the present invention provide that the information represented on the display device is adapted as a function of a situation. For this purpose, a representation may be designed in a manner that is optimized for a visual perception of the represented information.

If a control intention of a user is ascertained, however, then the represented information is changed such that an activation of a control element is possible in an optimal manner in accordance with the ascertained control intention for the control element.

According to example embodiments of the present invention, a method for operating an interactive control device, in particular in a motor vehicle, having a display device and information represented and/or representable on the display device, which information includes control elements, is provided, including the following:

ascertaining a control intention for at least one of the control elements represented on the display device, adapting the information represented on the display device as a function of the ascertained control intention such that the at least one control element intended for a control operation is represented in a manner optimized for activating the control element.

According to example embodiments of the present invention, for ascertaining the control intention for at least one of the control elements represented on the display device, it is ascertained whether a body part of the operator is situated within an activation region that is spatially defined with respect to a display region of at least one of the control elements on the display device.

The method may provide for ascertaining the control intention for the at least one control element prior to an activation of the control action.

A method for operating an interactive control device, in particular in a motor vehicle, having a display device, may include the following:

displaying graphical information on the display device;

receiving sensor information;

activating a control action if it is ascertained on the basis of the sensor information that a body part of a user is situated within an activation region, which is spatially defined relative to the display region of a control element on the display device to which the control action is assigned, it being provided that the received sensor information includes user information, which for communicating a control intention for the at least one control element is evaluated prior to an activation of the control action; and the information represented on the display device is adapted as a function of the ascertained control intention such that the at least one control element is represented in a manner optimized for activating the control action associated with the control element using the body part.

When changing from a visual layout, which is optimized for perceiving information, to a haptic layout, which is optimized for a control operation, the control element is superimposed or magnified for example. A small control element, for example, is magnified when a control intention is detected. This achieves the effect that a high density of information may indeed be represented on the display device, but that if a control operation is to be performed, this may be done comfortably at any time. User information is that sensor information that indicates a behavior of the user or that describes the user himself. The user information is ascertained with the aid of sensor units and is part of the sensor information that is evaluated in order to ascertain the control intention.

In order to be able to ascertain a control intention reliably, the sensor information may include information about a bodily action of the user. A bodily action, for example, is a movement of the user's arms or hands or fingers. Another bodily action, for example, is directing one's eyes in order to apprehend the information displayed on the display device.

The user information may include information regarding a viewing direction of the user. For an operation of a control element is often preceded by the user looking at the display device.

The viewing direction of a user may be detected by camera sensors for example. The user information may be detected at least partly by a camera system. Using such a camera system normally also makes it possible to detect reliably the movement of body parts.

Other exemplary embodiments of the present invention provide for the user information to be detected at least partly by an ultrasonic sensor system. An ultrasonic sensor system is suited to determine the position of body parts in a particularly exact and reliable manner. Using an ultrasonic sensor system it is thus possible to detect reliably a movement toward the interactive control device already at a relatively great distance from the control device. Likewise it is possible to perform precise position, extension and speed measurements in a close range from the control device. An ultrasonic sensor system may be used as an alternative to or together with other sensor systems.

A direction of movement of the body part may be ascertained on the basis of the user information. This direction of movement may be used individually or together with other information for example, in particular user information, preferably of a viewing direction, in order to determine a control element or several control elements from a group of control elements, which the user wishes to operate next. Example embodiments of the present invention therefore provide for ascertaining a control probability for the control element and possibly additional control probabilities for additional control elements when ascertaining the control intention and for adapting the represented information such that the at least one control element or the additional control elements, in accordance with their control probability, are represented in a manner optimized for an activation of the respectively associated control action or additional control actions. This makes it possible to implement a kind of "control spotlight". As a function of a distance of the body part, its direction of movement and/or a speed of the movement as well as additional user information, a region on the display device may be ascertained in which the control element to be operated is probably situated. This ascertained region is referred to as the control spotlight. At a great distance and slow speed of movement of the control hand, the control spotlight is still quite fuzzy, but becomes sharper with increasing proximity to the display device. Fuzzy means that there exists an uncertainty regarding a target position toward which the body part is moved on the display device. This target position is used as a center point of the control spotlight. The uncertainty is expressed in a surface of the control spotlight on the display device. The control spotlight is normally designed to be circular such that the fuzziness or uncertainty regarding the target position toward which the body part is moved on the display device is expressed in a radius of the control spotlight. The greater the uncertainty (the fuzzier the control spotlight), the larger it is. The smaller the uncertainty regarding the target position (the sharper the control spotlight), the smaller becomes the control spotlight. For example, there is a provision for the control elements on the display device to be scaled or to be optimized in another manner for simple activation, for example by an animation, an expansion of a menu bar, etc., depending on how much of their surface at a predefined scaling dimension is located in the region of the control spotlight, how sharp the control spotlight is and/or how great a distance of the control element from the position (the center) of the control spotlight is.

Exemplary embodiments provide for the ascertainment of the control intention and the corresponding adaptation of the represented information to be performed iteratively and/or continuously. This makes it possible to ascertain the control spotlight continuously, for example, and to scale the control elements located within the control spotlight on the display device steplessly and to adapt them to the movement of the user.

Example embodiments of the present invention provide for the adaptation to involve changing a transparency, a distance from adjacent additional control elements and/or an animation of the control element or of several control elements. For this purpose, a list that includes multiple control elements may be suitably animated so as to facilitate a selection of one or more list elements. In particular, depending on the ascertained control intention, it is possible to scroll or leaf through a longer list.

There may also be a provision to ascertain a distance of the body part from the representation of the control element on the basis of the user information and to scale the control element as a function of this distance. If a contactless sensor is used to activate the control elements for example, then this sensor may detect an approach of the user's hand, for example, approximately 30 cm in front of the display device. The more closely the hand or the finger approaches the display device, the more readily may a prediction be made as to which control element is to be activated. Hence it is then readily possible to represent this control element in a particularly optimized manner on the display device. For this purpose, the represented information is adapted accordingly.

In addition to information about the user, example embodiments provide for the evaluation of information about a driving condition in order to optimize the adaptation of the control element. Thus, for example, driving over an uneven roadway surface affects a user's motoric accuracy in hitting the control element. In such a case, the control element may be displayed larger than in a driving situation on an even, smooth roadway surface. This ensures an improved operability and an increased convenience. At the same time, a maximum possible representation of information is ensured in a situation-dependent manner. Hence, if no control intention is ascertained, it may be provided to adapt the information to a representation that is optimized for a visual communication of information, for example by suppressing all control elements or by "representing" them at a transparency of 100%. This is advantageous in particular in interactive control devices in which only a very limited selection of information may be displayed, because a display surface is small for example.

Example embodiments of the present invention provide for gestures performed by the body part to be detected and evaluated when ascertaining the control intention, the adaptation of the represented information being performed in accordance with an adaptation function assigned to the respective detected gesture. This makes it possible for example to render a control intention more concrete in case of a particularly high number of potentially operable control elements. A static gesture, for example, may communicate a stop signal, which prevents a further adaptation of the control elements and allows for a final selection without another scaling adaptation. Likewise, a scrolling action may be initiated through a multiplicity of small graphic control elements, one of which is provided with a focus and is magnified for a control operation. The adaptive function thus bring about any suitable modification of the represented information.

So-called static gestures, dynamic gestures and complex gestures have proven to be suitable gestures. Example embodiments of the present invention therefore provide for the gestures to include at least one static gesture that is recognized on the basis of a predefined body part attitude. The gestures may include at least one dynamic gesture that is detected on the basis of a predefined path line traversed by the body part. In the case of a path line, on the one hand, the shape in three-dimensional space may be analyzed. Additionally, however, the speed may also be evaluated, at which the individual segments are traversed in three-dimensional space. The gestures may include at least one complex gesture, which is detected on the basis of a transition between predefined static gestures and/or a static gesture, which traverses a predefined path line. Exemplary embodiments of the present invention may thus take into account only static, only dynamic or only complex gestures or any combination of these. The gestures are detected by the at least one sensor unit, which is able to determine a position of a body part in space. This formulation, that the gestures are detected by the at least one sensor unit, is not meant to express that the gesture must be recognized by one single sensor unit if several sensor units are present. The formulation rather also includes the detection of the gestures by an interaction of several existing sensor units. Whether one individual sensor unit suffices for detecting a gesture depends on the special development of the at least one sensor unit and the gesture itself.

The information may be adapted such that in each case a maximum of information is represented for visual perception, and yet, in the event of a control intention, at least one control element, for which a control intention is ascertained, is represented for optimal operability. For this purpose, various situational influences may be taken into account.

The features of the device have the same advantages as the corresponding features of the method.

In the following, example embodiments of the present invention are explained in greater detail with reference to the appended Figures.

DETAILED DESCRIPTION

Figure 1:
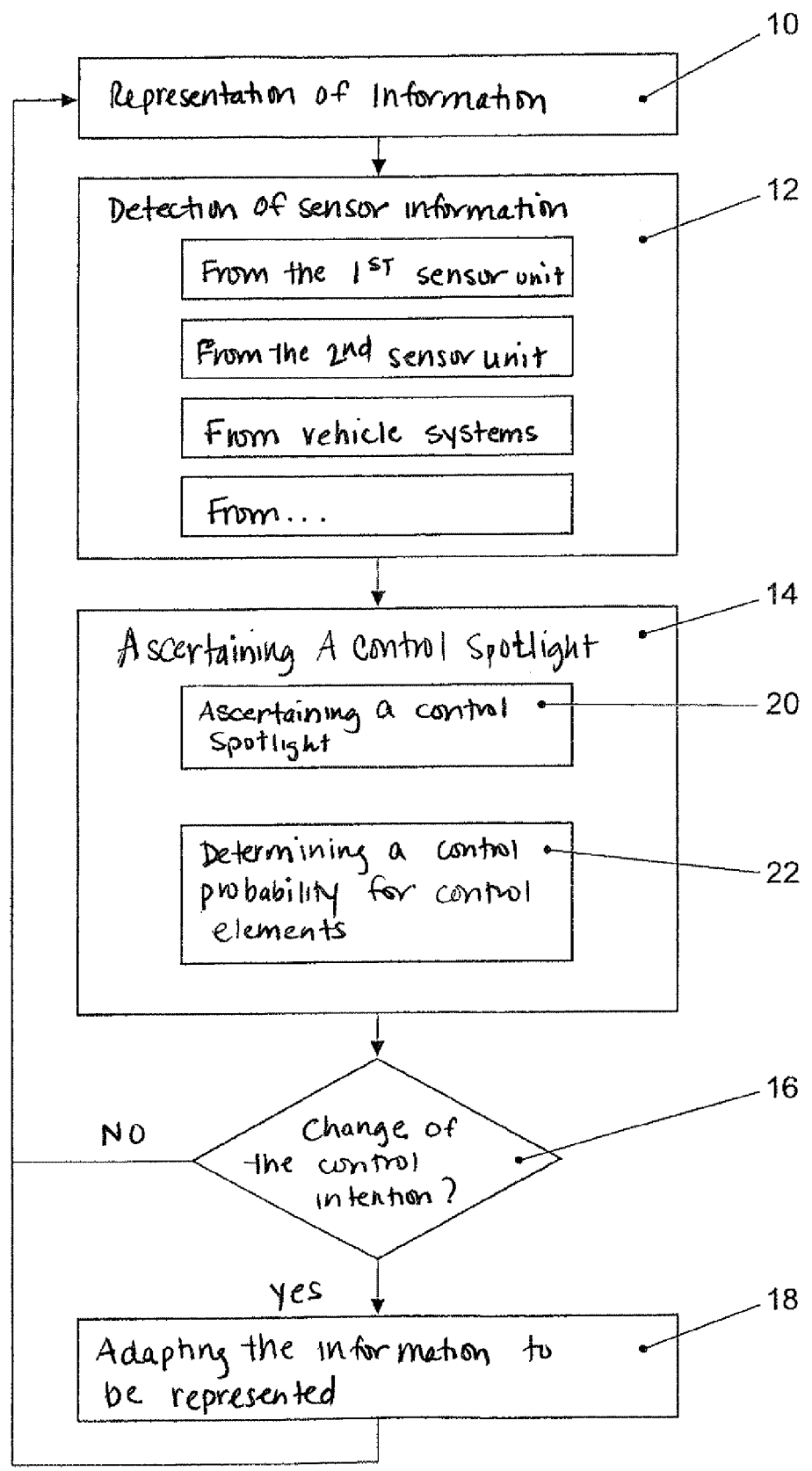
FIG. 1 is a schematic flow chart for explaining a method for operating an interactive control device according to an example embodiment of the present invention.

FIG. 1 shows a block diagram depicting a method 10 for operating an interactive control device. As represented by a method block 12, the method includes a representation of information on a display device. A layout for the representation of the information may be initially selected such that it is designed for an optimal visual communication of information. In the following, such a layout is called a visual layout.

The control device detects sensor information 12. The sensor information on the one hand includes information about one or several user(s). This information is called user information. The latter includes in particular information about bodily actions of the user(s), which are detected by sensor units. The bodily actions include for example an arm movement, which may be ascertained for example by a sensor unit which detects using cameras and/or a sensor unit based on ultrasound. Furthermore, using the sensor unit equipped with cameras it is possible to detect a viewing direction of the user(s). Directing one's view to the display device represents a particularly important bodily action since a control operation is usually preceded by a look onto the display device of the interactive control device. Additionally, the detected sensor information may include information about a driving situation or a surrounding environment of the motor vehicle. Certain control actions may frequently be preceded by certain driving events.

On the basis of the detected sensor information, a control intention of the user(s) is subsequently ascertained 14. In order to ascertain a control intention of the user, the various information contained in the sensor information, especially the user information, is evaluated. For this purpose, particularly the behavior of the user(s), i.e. the bodily action(s) of the user(s), are evaluated and assessed. If a change in the viewing direction onto the display device of the interactive control device is established, for example, and if correlated in time a movement of the arm or the hand, which is spatially nearest to the interactive control element, is detected, then a control intention may be deduced. Many different combinations of individual information are possible, which may be evaluated and assessed. For example, a targeted movement of a body part in the direction of the control unit may be a precondition for a control intention to count as detected.

With the aid of a query, a check is performed as to whether the control intention has changed 16. If this is not the case, then the representation of the information on the display device is continued without change. If a change in the control intention has occurred, i.e. if a control intention has been recognized or if it is established that a control intention no longer exists, then the information that is represented on the display device is adapted in accordance with the control intention or the nonexistent or no longer existing control intention 18. A change exists even if the control intention has become (more) concrete.

If the change of the control intention lies in the fact that a control intention of a user is detected that did not exist previously, then the information to be displayed is changed such that the layout on the display device is optimized for a haptic control operation. Example embodiments may provide for no control elements to be graphically represented in the visual layout. In the haptic layout, the control elements are inserted, i.e. their transparency level of 100% is reduced. There may likewise be a provision to switch from a pictorial representation to a text representation. In example embodiments, in which small control elements are graphically represented in the visual layout, the control elements in the haptic layout may be magnified. The adaptation may further include a change in the design of the control elements, for example an animation of the control element (widget). In a display device in the form of an autostereoscopic three-dimensional display device, a spatial protrusion of the control elements or a spatially anterior superposition of the representation of the information may be provided.

The ascertainment and adaptation of the represented information may occur in steps that may transition into one another continuously. First, a control intention is ascertained using sensor information of a first sensor unit. The first sensor unit may include an imaging sensor system, for example a camera system. If this general control intention has been detected, then the visual layout is switched to a haptic layout. Control elements are inserted for example, which were previously not visible.

When ascertaining the control intention, example embodiments furthermore provide for a position and a surrounding region on the display device to be ascertained, which is intended for a control action, i.e. an activation of a control element. This process is called a determination of a control spotlight 20.

Various sensor information may be evaluated for ascertaining the control spotlight. In particular, a direction of movement of a body part of the user and a speed of movement, a viewing direction onto the display device and information about the driving situation are evaluated individually or jointly. As the result of ascertaining the control spotlight, one obtains a position on the display device, which indicates the intended target position, and a radius, which is a measure for the uncertainty of the ascertained intended target position. Exemplary embodiments may provide for the shape of the control spotlight to be noncircular. This is advantageous in particular if the control direction deviates greatly from a direction of a surface normal of the display surface of the display device.

The information that characterizes the control spotlight (position/radius and/or other indication of region) is taken into account when adapting the information to be represented. For example, the control elements are scaled as a function of the distance from the position and a planar overlap with the control spotlight. This means that control elements situated near the position of the control spotlight, which is at the center of the control spotlight, are scaled larger than those elements that are further removed from the position of the control spotlight. Furthermore, those control elements are scaled larger that have a large planar overlap with the control spotlight when projecting the control spotlight onto the display device. FIGS. 4A through 4D show examples of this. Even control elements 61', which are not situated in a control spotlight 62, but are situated nearer to control spotlight 62 than other control elements 61'', may be displayed larger than these other control elements 61''.

The described method represents a determination of a control probability for the individual control elements 22.

These control probabilities may also be determined according to another method on the basis of the user information, possibly by taking into account other information about situational influences, for example the driving situation, hitherto existing habits of the user, etc.

The control spotlight is continuously adapted. In a further step, the movements of the body part and possible additional properties of the body part are ascertained more precisely using a second sensor unit.

In example embodiments, in which transducers generating high-frequency signals are situated near the body of the user and receivers are situated on or around the display device in order to receive high-frequency signals transmitted via the body of the user and to determine from this a position of the hand of the user near the display device, the adaptation of the represented information may be finely adjusted particularly well. Body parts of users may be detected by such sensor systems at a distance of approximately 30 cm from the display device. If multiple users are within the range of the interactive control device in a vehicle, for example the driver and the front passenger of the motor vehicle, these may be distinguished on the basis of different high-frequency signals that are coupled into the body of the user via different transducers, which are integrated for example in a driver seat and in a front passenger seat. A scaling or general adaptation of the represented information may thus be additionally adapted to the function (driver/front passenger) of the user. For example, it is practical to represent fewer, but instead larger control elements on the display device if a driver wants to activate control elements on the display device at a high speed of the motor vehicle. A front passenger, who does not have to concentrate on driving the motor vehicle, may operate smaller control elements, for example, of which instead more are representable on the display device. In order to perform the fine adjustment, a provision may be made to ascertain a distance of the user's body part from the display device when detecting the control intention. Additionally, the extension of the body part is ascertained. This extension is also taken into account when scaling and/or refining the control element(s). For a user who has large and wide fingers, the control elements must be displayed larger than for a user who has small and narrow fingers. A finer adaptation is thus possible in the additional step. More than two steps may be provided. The second sensor unit may also be an sensor unit based on ultrasound.

Figure 2:
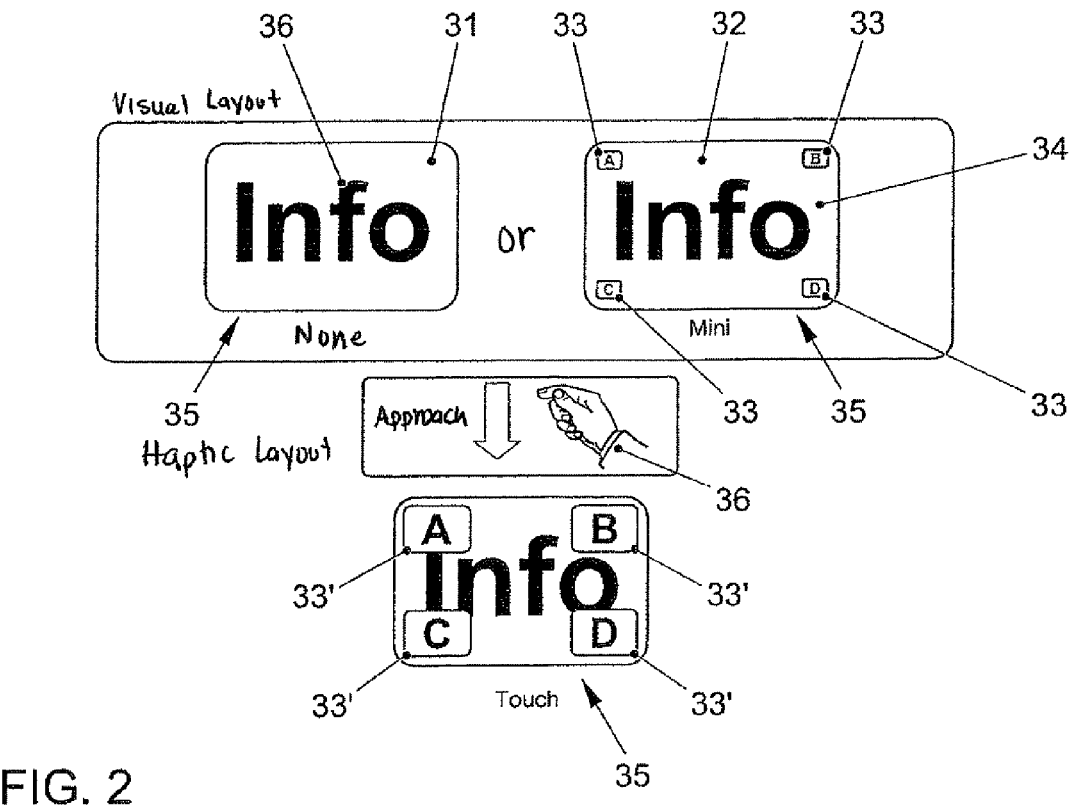
FIG. 2 is a schematic representation, on the basis of which the principle of a situation-dependent scaling of control elements is represented.

FIG. 2 schematically shows the switch from a visual to a haptic layout. The upper region of FIG. 2 shows two possible developments of a representation of information 31, 32 in a so-called visual layout. The left representation 31 does not show any control elements. The right representation 32 shows small control elements 33. The largest region 34 of display device 35 is intended for displaying the information. If a body part 36, in this case a hand, approaches display device 35, as is indicated at the center of FIG. 2, then the represented information is changed such that control elements 33' are magnified, that they include additional text information (A, B, C, D) and are changed in their transparency level at least as compared to representation 31 in the upper left corner. The haptic layout is optimized such that control elements 33' may be touched optimally by one finger in order to be able to activate and trigger a control action associated with control element 33'.

Figure 3:
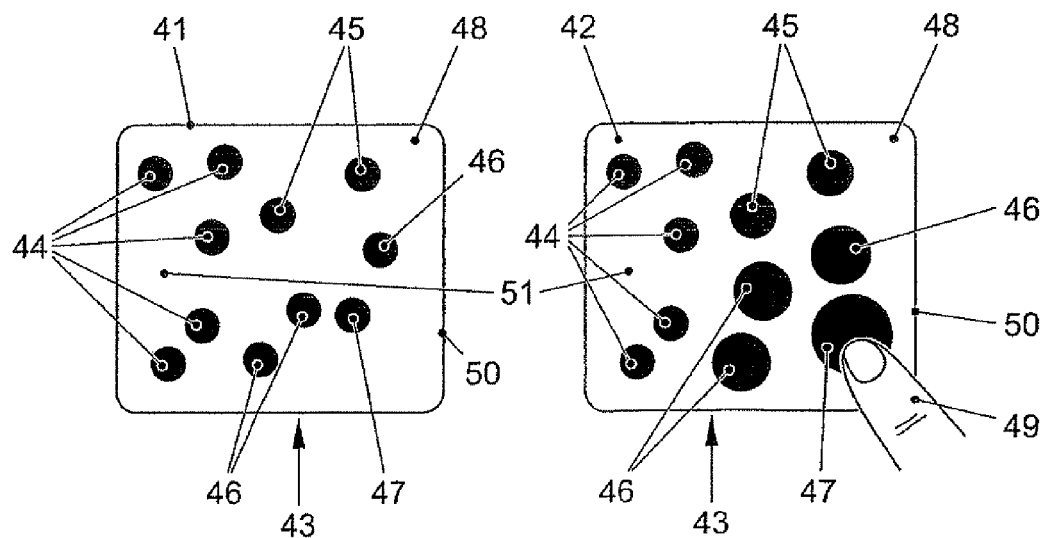
FIG. 3 provides schematic views of a display device, on which information is represented optimized for visual perception or partly optimized for haptic operation.
Figure 4A:
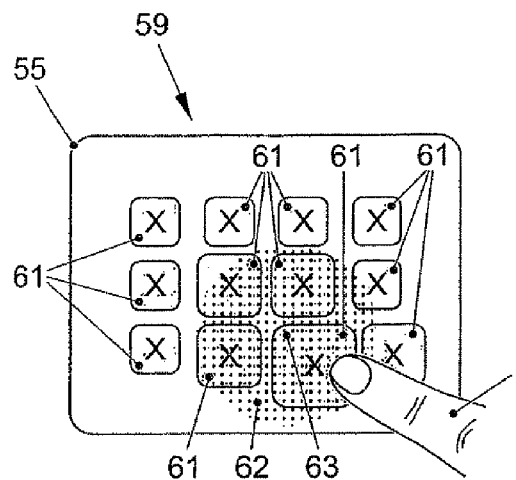
FIG. 4A-4D are schematic views of information represented on a display device, which includes control elements that are partly magnified in accordance with an ascertained control spotlight.
Figure 4B:
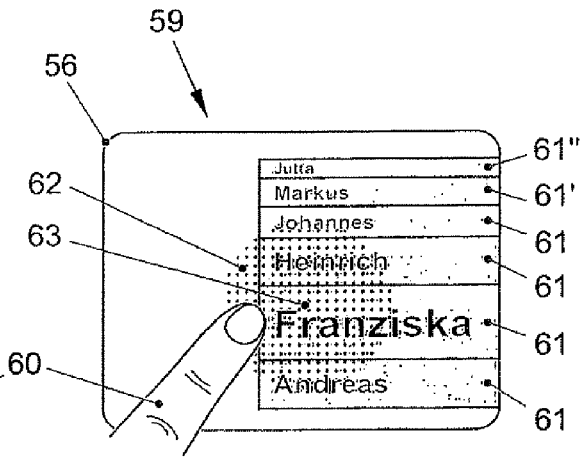
Figure 4C:
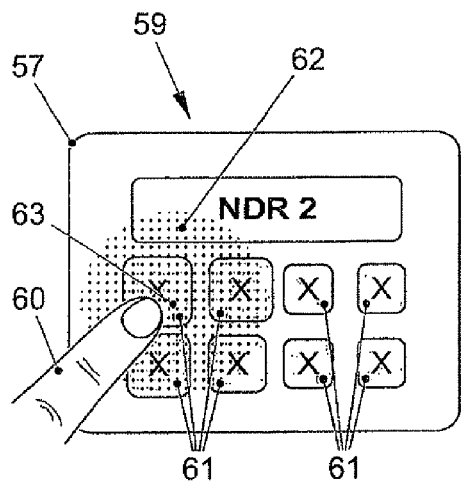
Figure 4D:
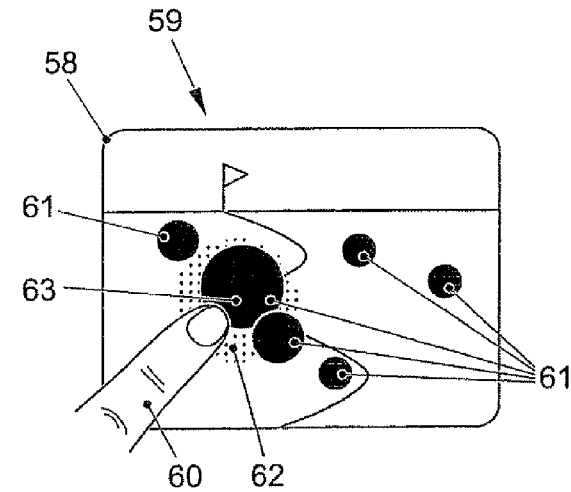

FIG. 3 shows another example for switching from a visual layout 41 to a haptic layout 42. Points of interest (POI) 44-47 of a map view 48 of a navigation system are schematically represented on display device 43. If a finger 49 approaches display device 43 with a movement that aims at the bottom toward the right edge 50 of the display device, then the points of interest are scaled in terms of their planar dimension as a function of a distance from the lower end of right edge 50. In order to achieve an improved operability, some points 46, 47 are shifted slightly with respect to their original position. In a left section 51 of map view 48, the layout is still adapted for a visual communication of information.

FIGS. 4A through 4D show different representations 55-58 of information on display device 59. In addition to a finger 60, which respectively intends to operate one of control elements 61, a so-called control spotlight 62 is shown in circular shape on display device 59. Control elements 61 are scaled as a function of their position relative to position 63 (the center) of control spotlight 62 and a planar overlap with control spotlight 62. The overall dimension of the scaling may be a function of a driving situation. If the vehicle is traveling on an uneven surface at high speed, for example, then the control elements have to be scaled larger than when traveling on an even roadway at low speed. Control spotlight 62 exists only virtually and is normally not represented on display device 59. Control spotlight 62 is represented only for the purpose of illustration.

Figure 5A:
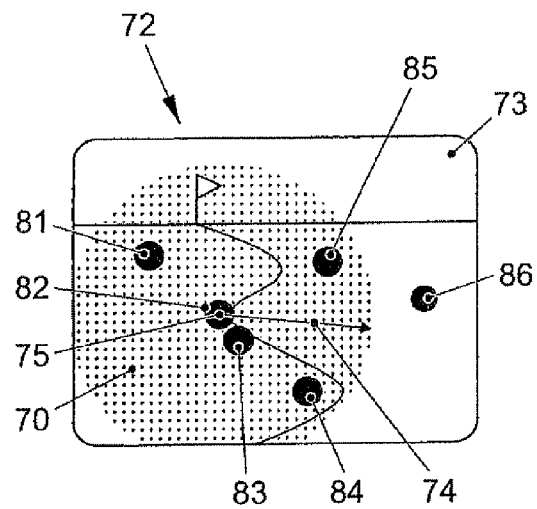
FIG. 5A-5D are schematic views of a display device on which the control elements are scaled as a function of a size of an ascertained control spotlight.
Figure 5B:
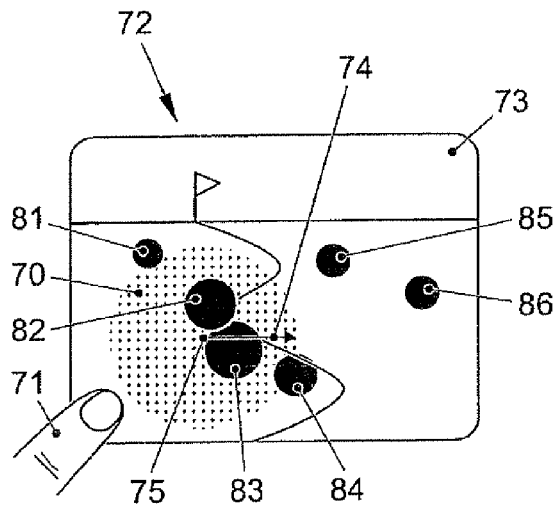
Figure 5C:
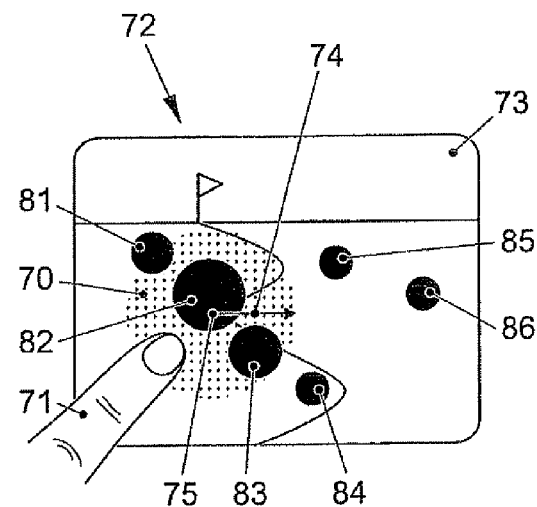
Figure 5D:
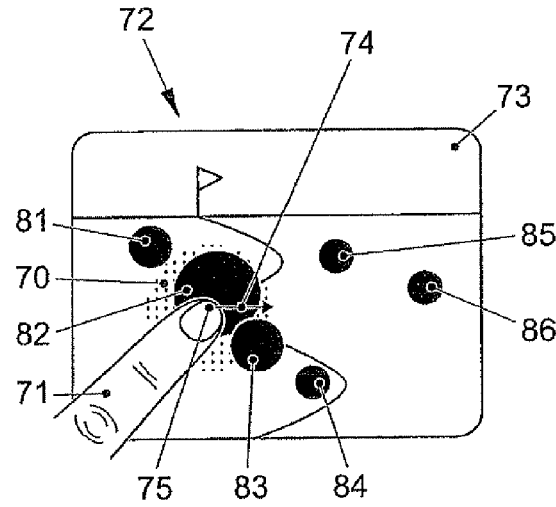

FIGS. 5A through 5D show how control spotlight 70 changes when a finger 71 approaches display device 72 and how this affects the scaling of the control elements in example embodiments. Views 73 of a display device 72 shown in FIGS. 5A through 5D respectively show a navigation map with points of interest 81-86, which are control elements. A haptic layout is selected in FIG. 5A, in which points of interest 61-65, which lie in control spotlight 70, are represented larger than point of interest 86, which lies outside of control spotlight 70. View 73 as shown in FIG. 5A corresponds to a representation in which the operating hand is still far away from display device 72. Therefore, a finger is not yet shown in FIG. 5A. When finger 71 approaches, a radius 74 of control spotlight 70 is reduced such that control spotlight 70 is smaller in FIG. 5B. Control elements 82, 83 situated near a position 75 (the center) of control spotlight 70 are scaled to be the largest. Point of interest 86, however, is also scaled to be larger compared to its representation in FIG. 5A. As finger 71 approaches further, the analysis of the direction of movement of finger 71 reveals that position 75 of control spotlight 70 has shifted slightly. Point of interest 82 in FIG. 5C is therefore scaled to be larger than point 83, which is further removed from the center position 75 of control spotlight 70. FIG. 5D shows the situation in which finger 71 is situated in an activation region that is defined relative to the representation of the control element. In an interactive control device in the form of a touch screen, this is normally the surface of graphical representation. In a control device having a contactless sensor, this may be a spatial region, which is defined preferably at a short distance in front of the graphical representation of the control element or bordering to the graphical representation.

If the body part, in this case finger 71, is located in the activation region, then the control action associated with the control element is activated.

Figure 6A:
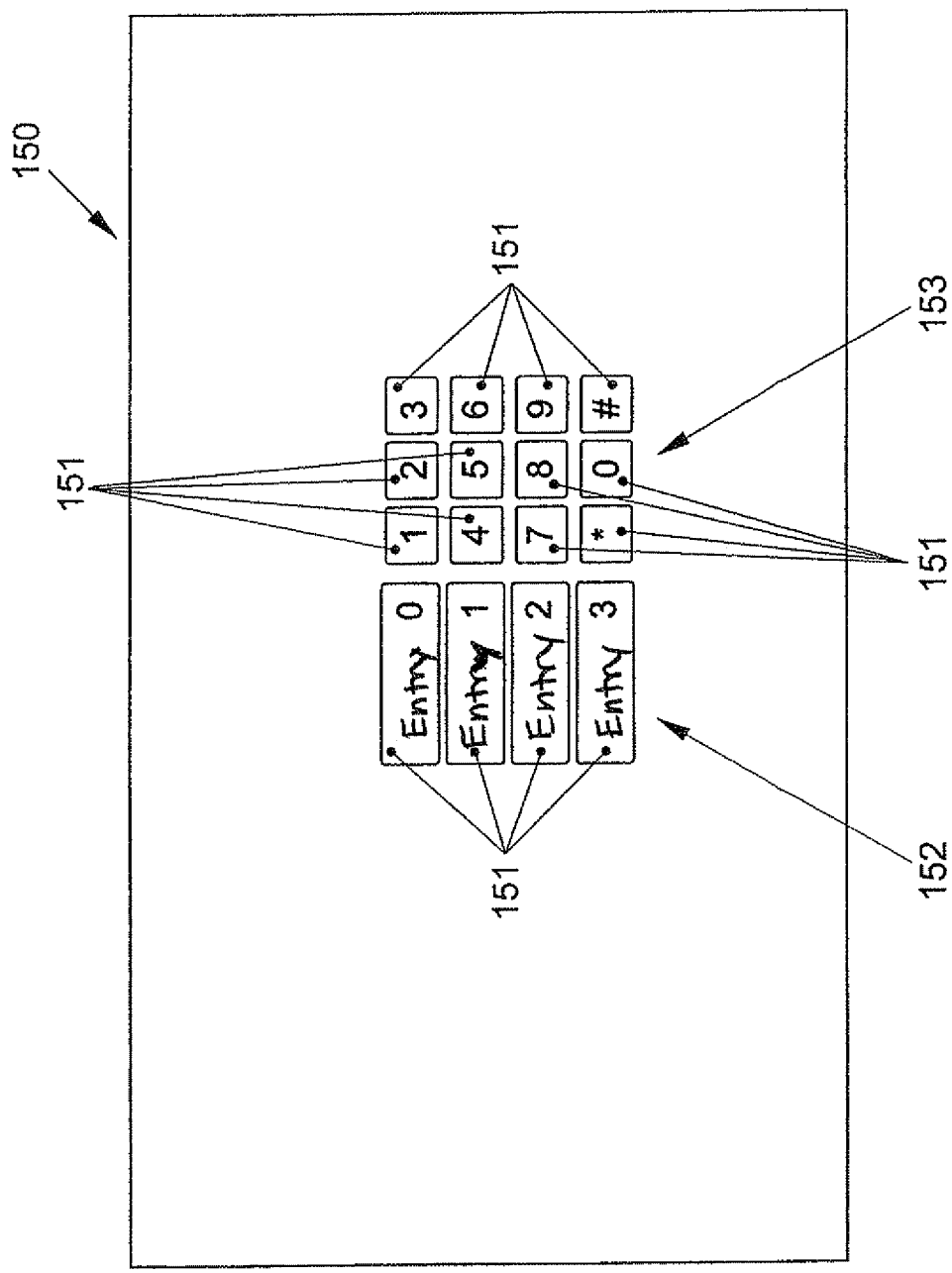
FIG. 6A-6C are schematic views of a display device on which control elements are scaled differently as a function of a control intention.

FIG. 6A shows a schematic view of a display device 150, on which control elements 151 are situated in two groups 152, 153. In first group 152, associated control elements 151 are arranged as a list. In the second group, control elements 151 are arranged as a number pad. In FIG. 6A, control elements 151 of the two groups 152, 153 only take up a small area on display device 150. A large part of the surface may be used for representing additional information.

Figure 6B:
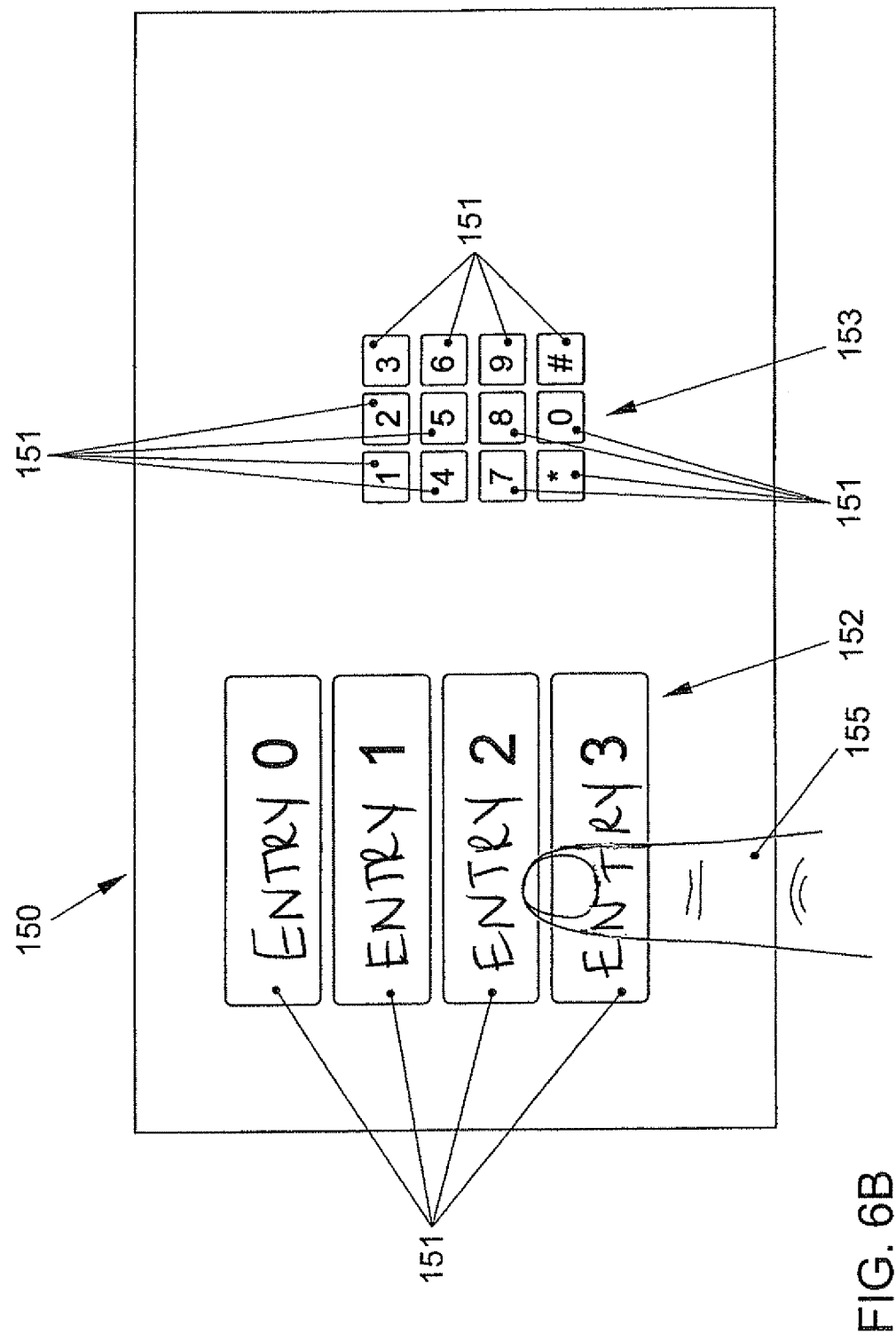
Figure 6C:
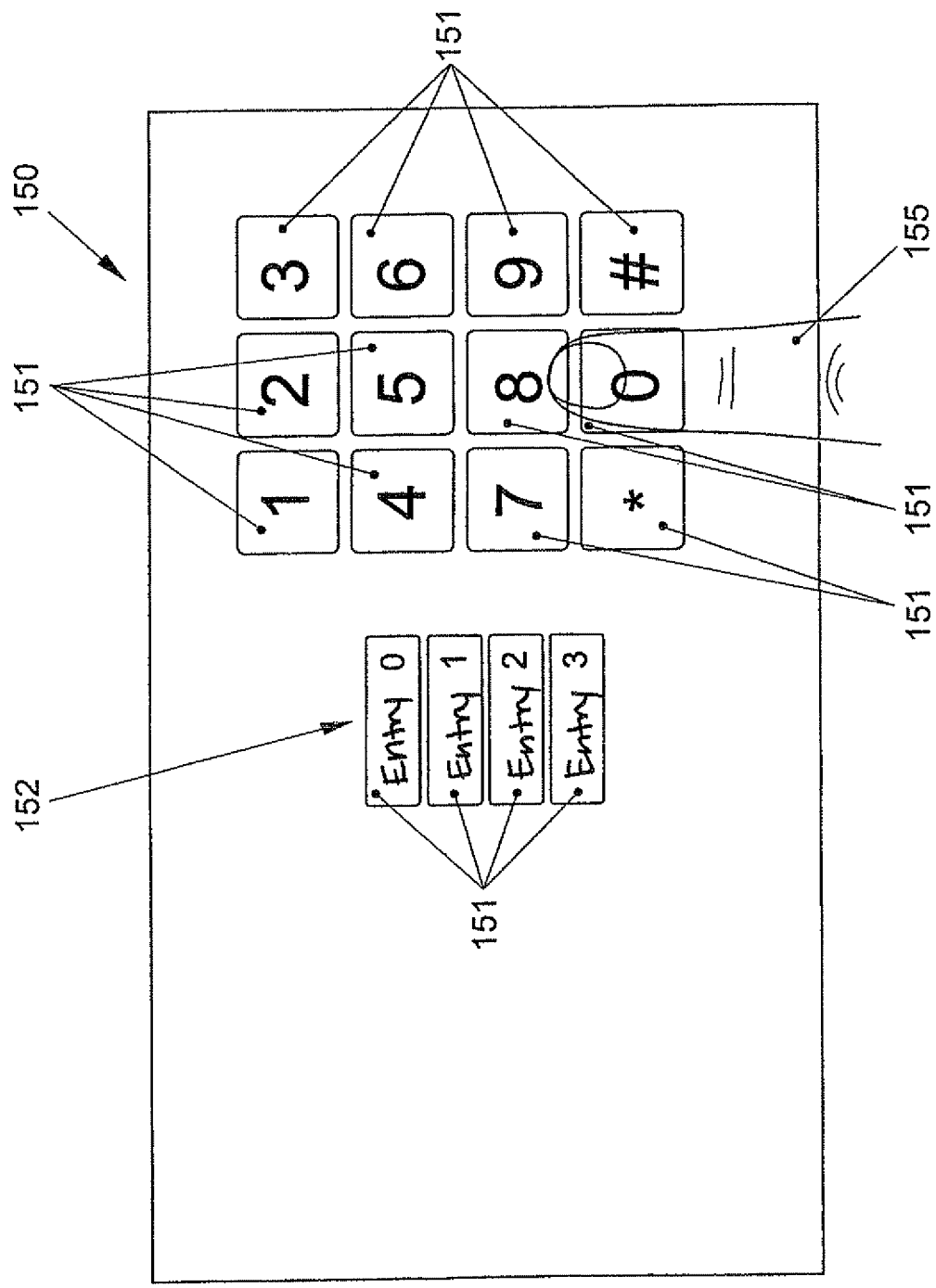

If a finger 155 approaches display device 150, control elements 151 in one of the two groups 152, 153 will be magnified. If a control intention is ascertained for one of control elements 151 of the first group 152 developed as a list, then the list is magnified, as shown in FIG. 6B. If finger 155 rather approaches second group 153 of control elements 151 developed as a number pad, then these control elements are magnified, as shown in FIG. 6C.

While in the exemplary embodiment described in connection with FIGS. 5A through 5D, the center points of the control elements may not be shifted on the display device, in the exemplary embodiment described in connection with FIGS. 6A through 6C, the positions of the control elements are markedly changed.

Figure 7A:
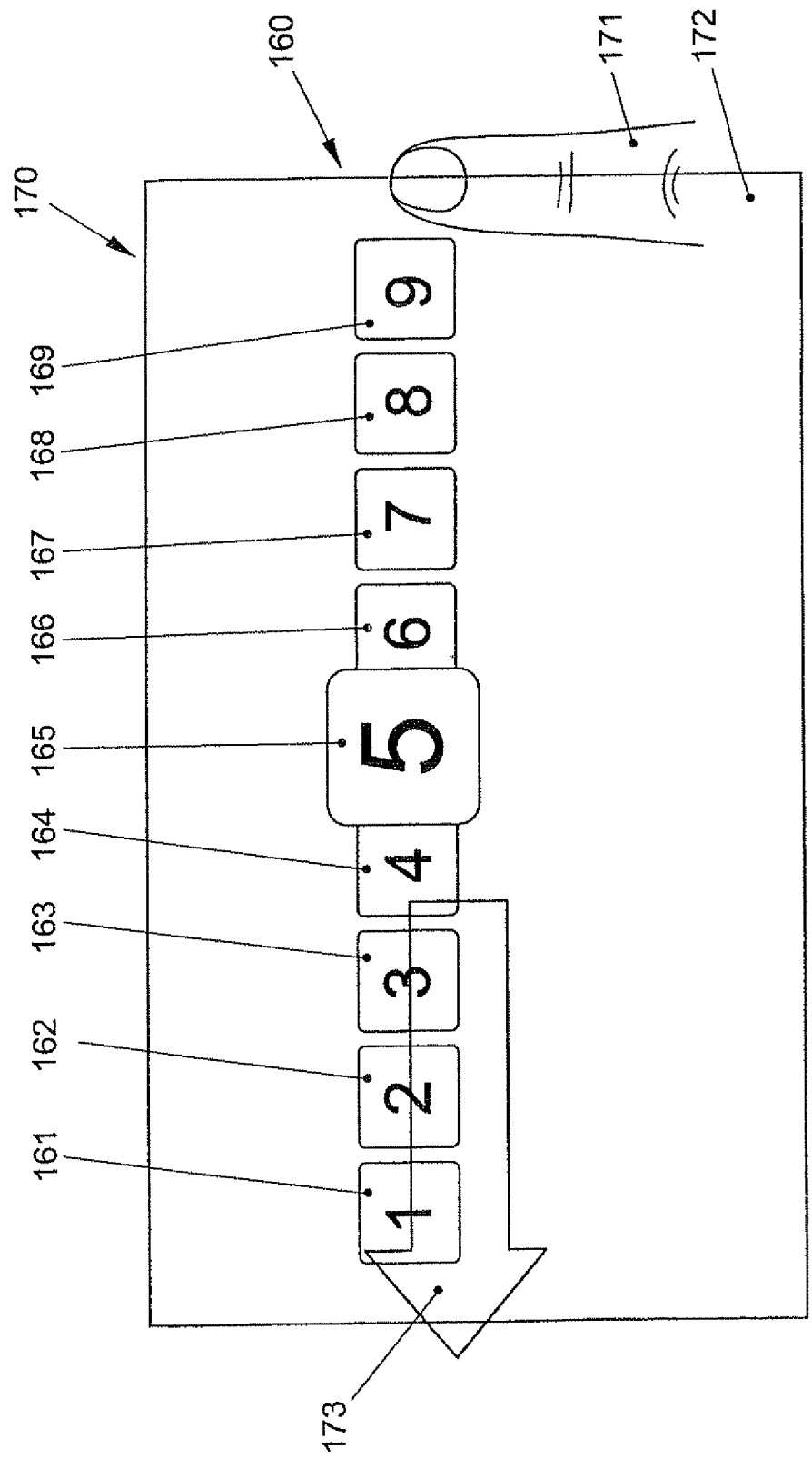
FIG. 7A-7B are schematic views of a display device on which control elements of a list are scrolled through as a function of a control intention.
Figure 7B:
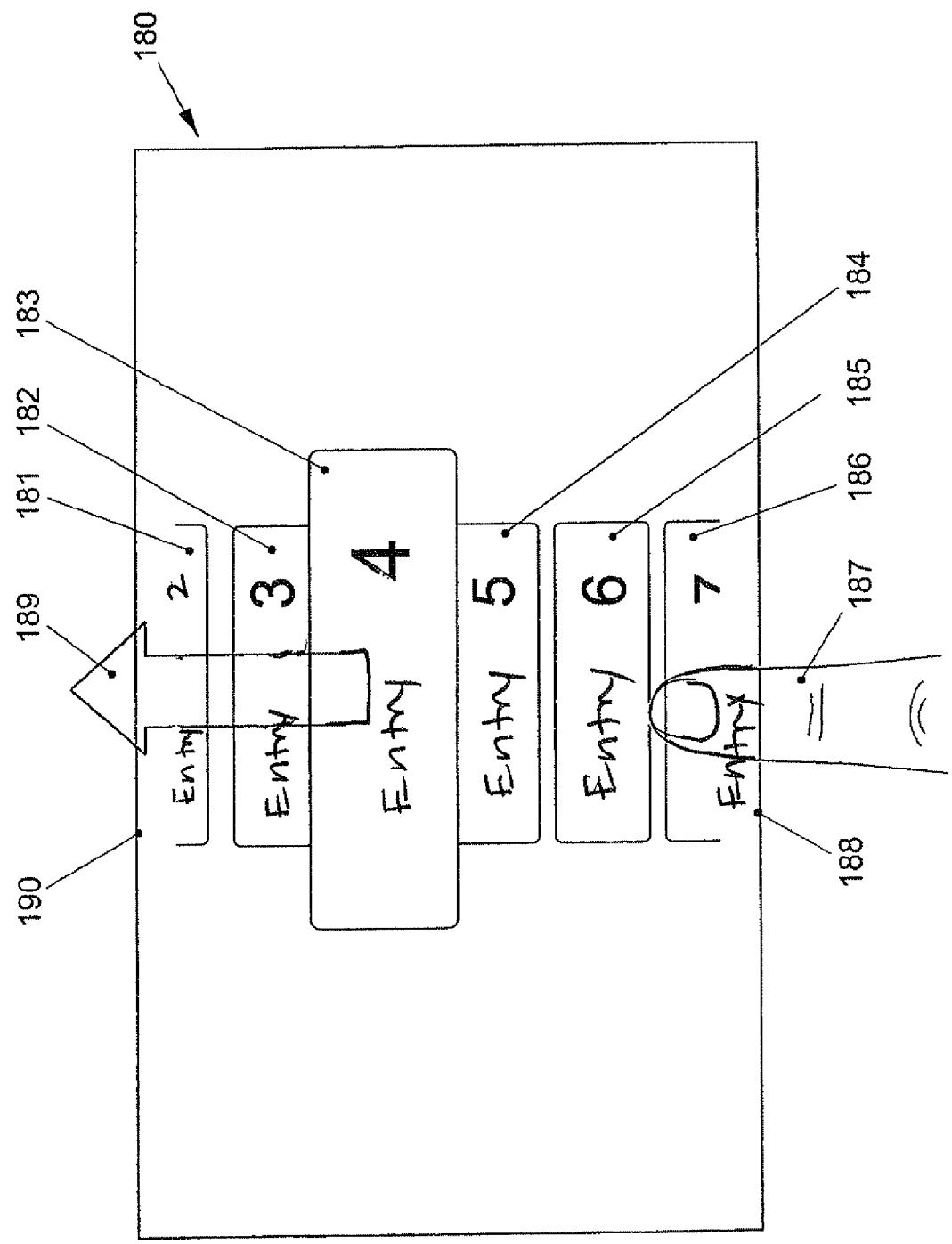

The following will describe, with reference to FIGS. 7A and 7B, how an ascertained control intention may be utilized in order to select a control element from a list.

FIG. 7A shows a horizontal list 160 of control elements 161-169 on a display device 170. If a control intention is ascertained, then a focus is assigned to one of control elements 165 of list 160. In this case, the focus is assigned to control element 165 labeled by the number "5". This is indicated in that control element 165 is magnified. Normally, the focus is assigned to a control element of list 160 shown at the center of control device 170. Alternatively, the focus may also be assigned to a control element displayed on an edge.

The focus may be "shifted" in that the user moves his finger 171 to an edge of display device 170. In FIG. 7A, Finger 171 is located on a right edge 172 of display device 170. In example embodiments, this allows for the focus to be shifted to the right.

Alternatively, there may be provision for the focus to remain at the center of display device 170 and for control elements 161-169 to be shifted relative to the focus. That is, the control fields move to the left, as is indicated by an arrow 173. This means that the focus is next assigned to control field 166 having the number "6", control field 166 being magnified at the center of display device 170.

In both exemplary embodiments, the focus scrolls or leafs through the list of control elements.

This process may be terminated in that finger 171 is moved across the center of display device 170. Subsequently, the control element to which the focus is assigned may be activated in order to trigger the associated control action.

The scrolling or leafing speed may vary as a function of the position of finger 171. That is, the further the finger is moved from the center, the faster the scrolling/leafing occurs.

The leafing/scrolling direction may coincide with the direction in which the finger is moved or may be opposite. In the case of a list there may be a further provision for the list to be considered endless. This means that a final list element is again followed by the first list element.

FIG. 7B shows a display device 180, on which a list of control elements 181-186 is displayed. If a finger 187 approaches display device 180, then a focus is assigned to one of control elements 181-186. Control element 183, to which the focus is assigned, is magnified for optimal operation. Finger 187 is located on a lower edge 188 of display device 180. This has the effect that control element 181-186 move upward "through the focus", as indicated by arrow 189. If finger 187 moves into a center of display device 180, the scrolling process stops. The control element in the focus may be activated in an optimal manner. If finger 187 is moved into a position between the focus and an upper edge 190 of display device 180, then control elements 181-186 move downward. Thus is it possible to scroll in both directions.

It is not necessary for the focus to remain fixed in one position on the display device. Rather, it may move along with the control element to which it is assigned. If this control element is further away from a predefined setpoint position of the focus than the subsequent control element of the list, then the focus jumps to this subsequent control element.

Example embodiments may provide for multiple control elements to be magnified. For example, a primary focus and two secondary focuses may be provided. The control elements assigned to the secondary focuses are magnified, for example, but somewhat smaller than the control element assigned to the primary focus.

Example embodiments may provide for a control element, for which the highest control probability is ascertained (for example, the control element that is located in the fixed focus or the center of the control spotlight), to be activated if the body part of the user, for example the finger, abides unchanged for a predefined dwell time without an adaptation of the represented information occurring. This applies particularly also if the finger is not located in the actual activation region of the control element. This allows for a quasi activationless control of a control element.

Figure 8:
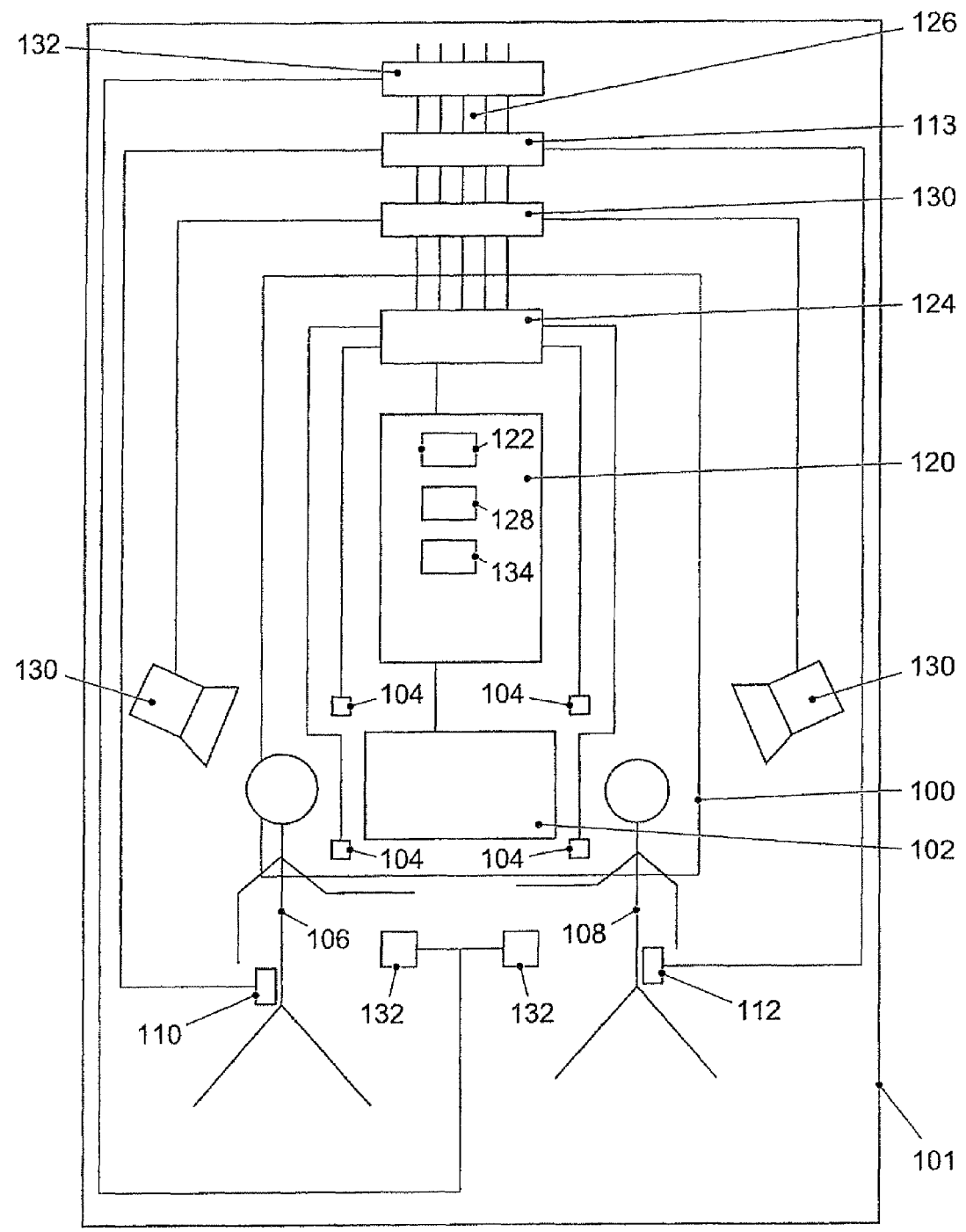
FIG. 8 is a schematic representation of an interactive control device in a motor vehicle.

FIG. 8 schematically show an example embodiment of an interactive control device 100 in a motor vehicle 101. This includes a display device 102, on which information may be represented in a visual and a haptic layout. Control device 100 has receiving sensors 104 integrated into it, which are able to receive in a contactless manner high-frequency signals transmitted via a body 106, 108 of a user, which are fed into the bodies by transducers 110, 112, which are situated in proximity to bodies 106, 108. Signal transducers 110, 112 are connected to a transducer unit 113, which in turn is coupled to a vehicle bus system 126. Together with receiving sensors 104, which already represent a sensor unit in the narrower sense, transducer unit 113 may also be regarded as a sensor system or a sensor unit. Interactive control device 100 further includes a control unit 120, which includes a representation module 122. Representation module 122 processes the information to be represented on display device 102. In particular, representation module 122 adapts the information to a visual or a haptic layout. Interactive control device 100 further includes a receiver unit 124, which receives, for example via vehicle bus system 126, information from sensor units that may take the form of a camera system 130 or an ultrasonic sensor system 132, for example. Via vehicle bus system 126, receiver unit 124 further receives information about a driving state of motor vehicle 101. An evaluation module 128 ascertains the control intention of user 106 or 108 on the basis of the received sensor information, which includes information about the driving condition. Representation module 122 modifies the information that is represented on display device 102 as a function of the ascertained control intention. Evaluation module 128 is preferably designed in such a way that a control spotlight and for the individual control elements a control probability are ascertained.

The control unit further includes an activation module 134, which triggers or activates a control action if a body part, for example a finger, is located in an activation region that is predefined relative to the representation of the control element on display device 102. In this connection, signals may be transmitted via the vehicle bus that influence other control devices of motor vehicle 101.

Control unit 120 and individually included modules 122, 128, 134 may take the form of hardware as well as software.

The display device may take the form of a projection display in which the represented information is projected onto a surface. In such a case, the distance or the movement of the body part relative to this surface or a look onto this surface, etc. are relevant.

In the sensor units that transmit high-frequency signals via the human body, frequencies in the range of approximately 80 kHz to 150 kHz may be particularly suitable. The sensor units, however, may also be operated at frequencies outside of this indicated frequency range.

In addition or alternatively to a sensor unit that detects a body part on the basis of the transmission of high-frequency signals via the human body, other contactless sensor units may be used such as sensor units based on ultrasound or even sensor units that use optical methods. Such a sensor unit may be designed, for example, according to the following principle. A transmitting LED radiates a rectangularly amplitude-modulated light signal in the optical or infrared wavelength range. The light signal reflected on an object is detected by a photodiode. A compensation LED sends a 180° phase-shifted, likewise rectangularly amplitude-modulated reference light signal to the photodiode via a constant light path. The compensation LED is controlled via a control loop using a control signal such that the received reflected light signal of the send LED and the received reference light signal of the compensation LED cancel out at the photodiode, and an equisignal is detected. A change in the control signal is a measure of the distance of the object. A sensor unit designed according to this principle is largely independent of temperature fluctuations and brightness fluctuations.

Figure 9:
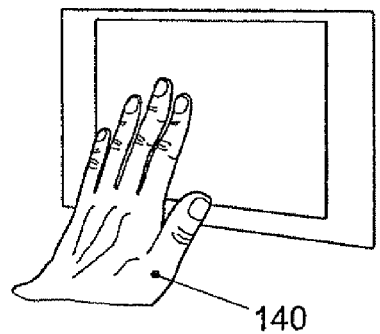
FIG. 9-17 illustrate static gestures performed by a hand.
Figure 12:
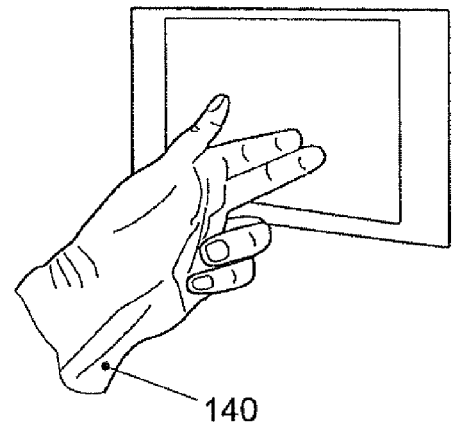
Figure 10:
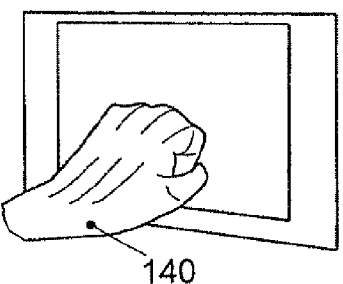
Figure 13:
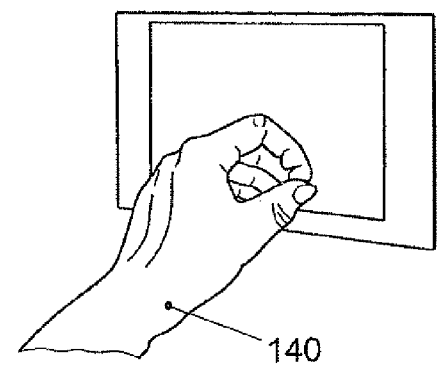
Figure 11:
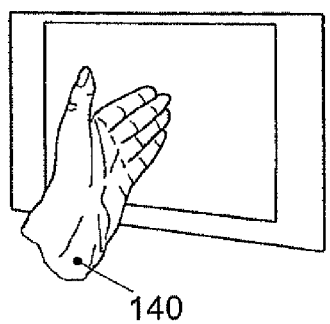
Figure 14:
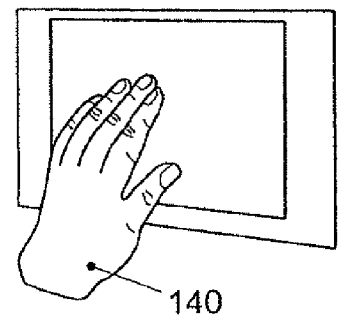
Figure 15:
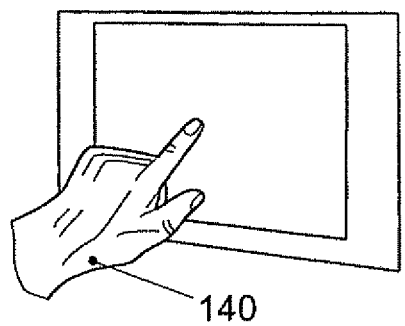
Figure 16:
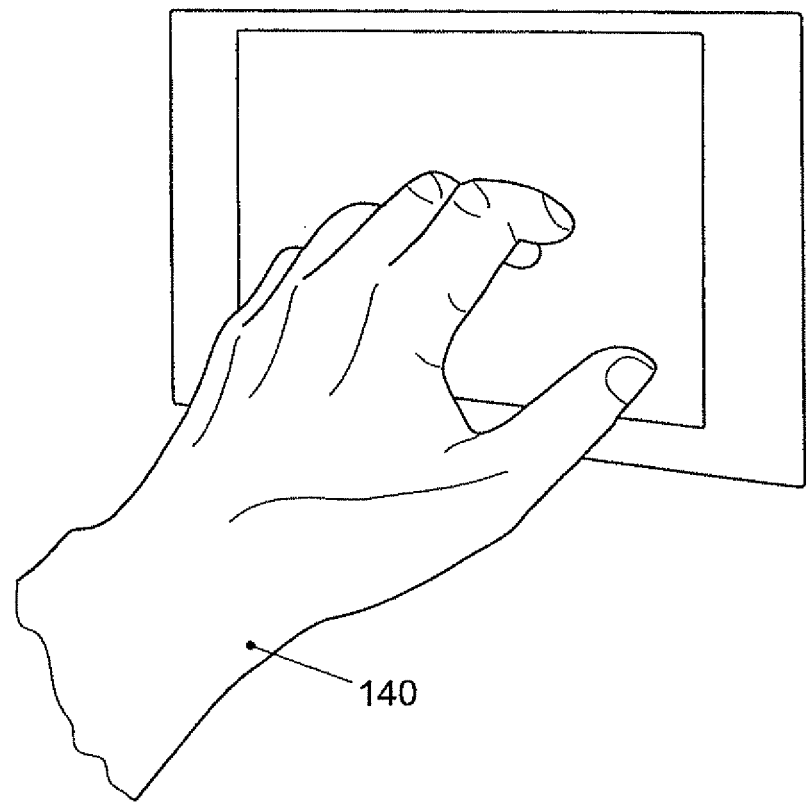
Figure 17:
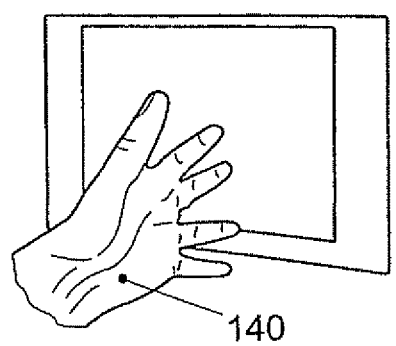

At least one sensor unit or several sensor units may be designed so as to be able to detect a planar extension of the body part (possibly by interacting). This makes it possible to detect gestures that are performed by the body part, for example a hand, and to interpret them as a control intention. Gestures that depend only on the body part attitude, in particular a hand attitude, are called rigid or static gestures. A hand 140 held flat in front of the display device, as shown in FIG. 9, may be interpreted as a stop signal for example, which stops a scrolling process or prevents any adaptation of the represented information for a predefined time span. FIGS. 10 and 11 show in exemplary fashion other simple static gestures, which are respectively performed by left hand 140. If it is possible to resolve multiple parts of the hand separately, then even sophisticated rigid gestures may be detected and used, as shown in exemplary fashion in FIGS. 12 through 17.

Figure 18:
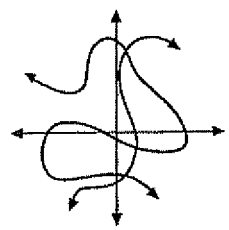
Figure 19:
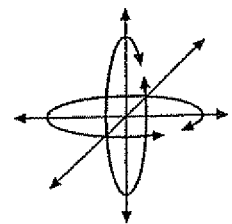
Figure 20:
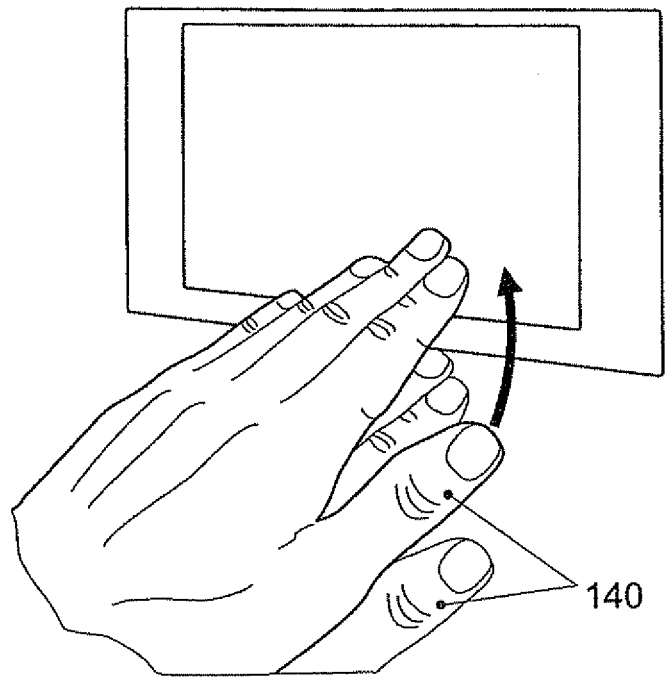
FIG. 20-27 illustrate dynamic gestures performed by a hand.
Figure 21:
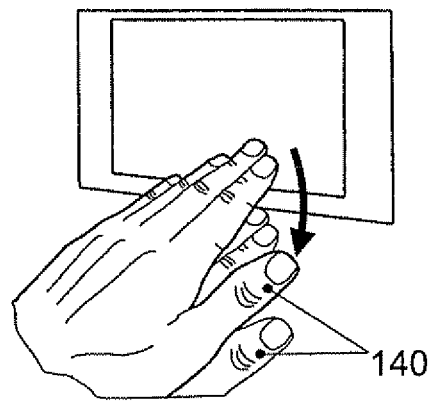
Figure 22:
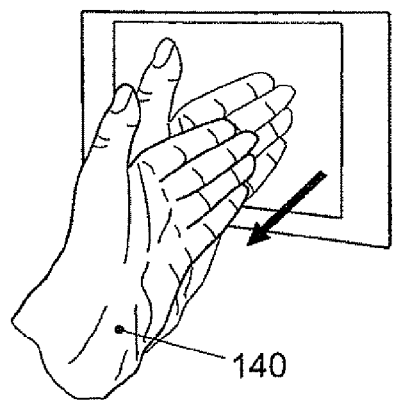
Figure 23:
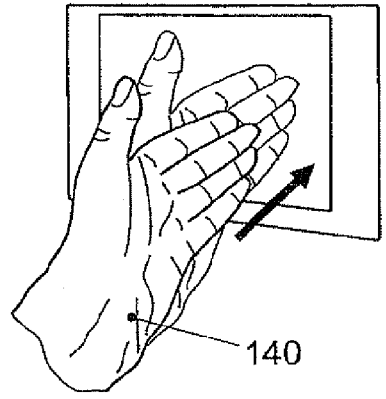
Figure 24:
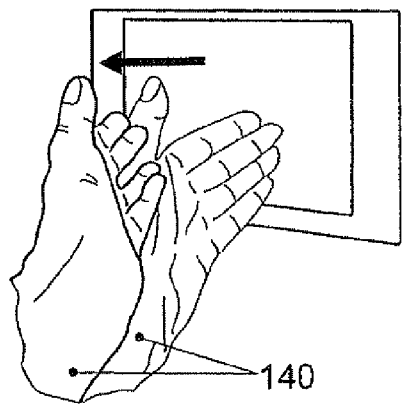
Figure 25:
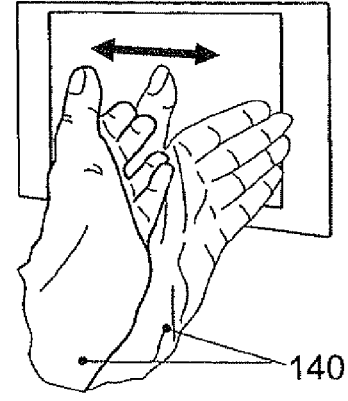
Figure 26:
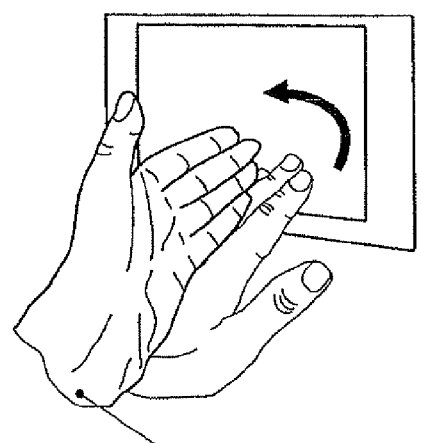
Figure 27:
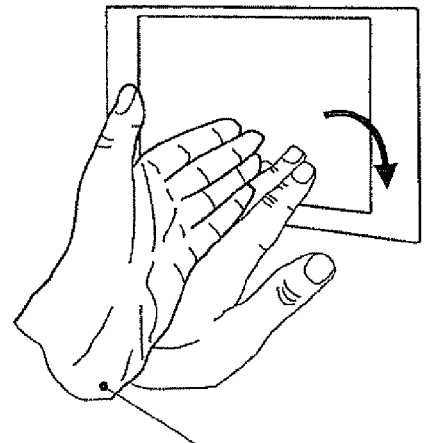

If the movement of the body part in a certain spatial region is compared to predefined path lines, then dynamic gestures may be detected. Examples of path lines are shown by way of example in a two-dimensional plane in FIG. 18 and in a three-dimensional space in FIG. 19. Examples of dynamic gestures are shown in FIGS. 20 through 27. The gestures shown in FIG. 20 includes a movement of horizontally flat extended hand 140 upwards, while the gesture shown in FIG. 21 accordingly includes a movement of hand 140 downwards. In FIGS. 22 through 25, the gestures are performed by a movement of the vertically flat extended hand away from the display device (FIG. 22) or toward the display device (FIG. 23) and a movement toward the left (FIG. 24) or a movement toward the right (FIG. 25). A speed of approach and/or removal of the body part may accordingly also be interpreted and used. FIGS. 26 and 27 show gestures that are performed by turning extended hand 140 about its longitudinal axis counterclockwise or clockwise.

The gestures may respectively also include both opposite directions of movement. In addition to the traversed spatial points that define a movement, an analysis of the path lines may also take into account a speed with which the movement is performed.

Figure 28:
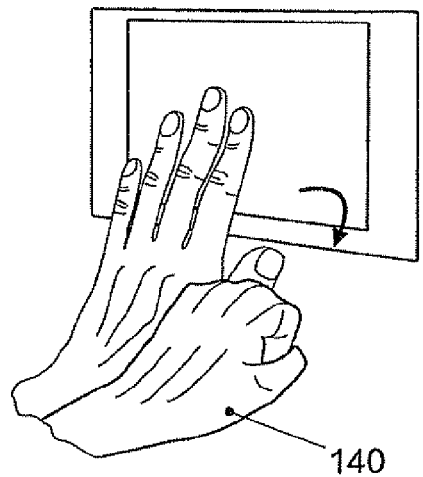
FIG. 28-33 illustrate complex gestures performed by a hand.
Figure 29:
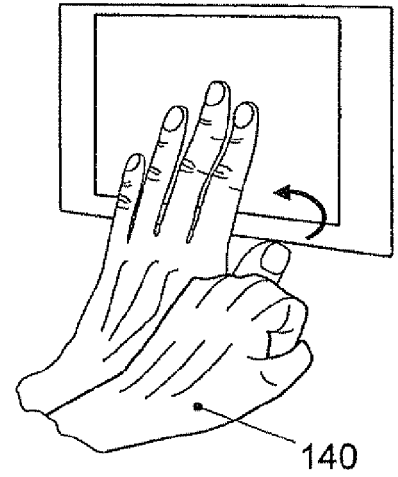
Figure 30:
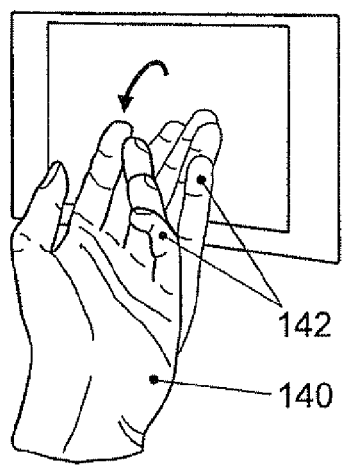
Figure 31:
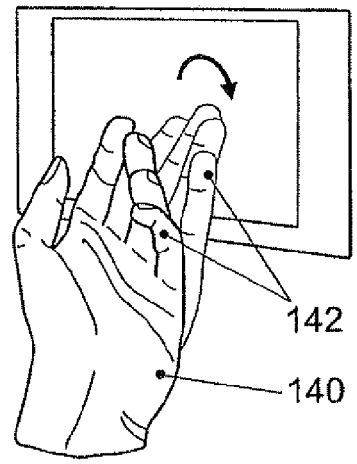
Figure 32:
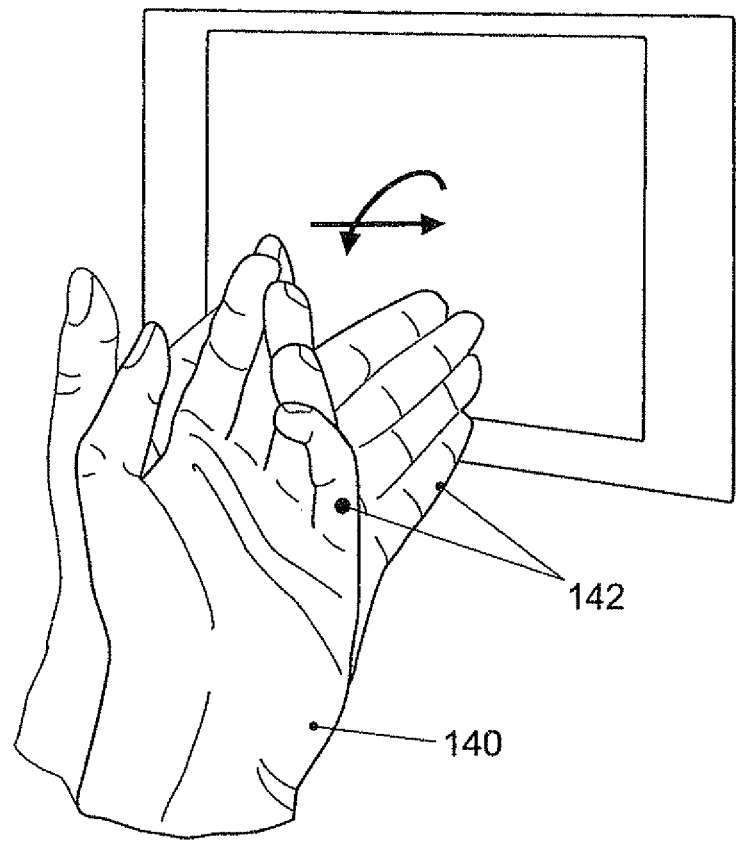
Figure 33:
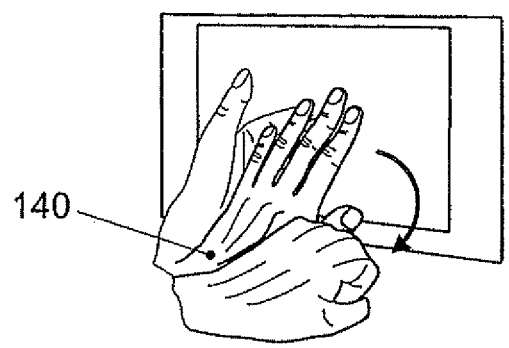

If it is possible to resolve multiple parts of the hand separately and/or to detect their relative speeds, then complex gestures or hand attitudes and sequences of movements, for example an extension and closing of the fingers of a flat hand or a clenching of the fingers to form a first (FIG. 28) and an opening of the first (FIG. 29) may be evaluated and taken into account accordingly. Additional complex gestures are shown by way of example in FIGS. 30 and 31, in which a performance of the respective gesture involves folding fingers 142 (FIG. 30) and extending fingers 142 (FIG. 31). FIG. 32 shows a complex gesture, in which a gravitational center of hand 140 performs a movement to the right in addition to folding fingers 142. In FIG. 33, the complex exemplary gesture shows a clenching of the originally vertically oriented, flat extended hand 140 and a simultaneous rotation of the hand by 90° to the right.

The gestures shown are only exemplary gestures. Various control intentions may be assigned to the individual gestures, which effect a corresponding adaptation of the represented information.

It may be provided for the interactive control device to be capable of being operated in a learning mode and thus be able to learn specific gestures in the individual specificity by different persons. For example, a driver may be prompted to perform specific gestures. An individual specificity of the gesture may be learned on the basis of the measurement data detected during the performance. Learning advantageously occurs in relation to individual persons. Persons may be identified by the specificity of the gestures themselves or by a user or driver identification encoded in a vehicle key for example.

Some exemplary embodiments may be provided such that gestures of a driver are distinguished from those of a front passenger. If the interactive control device is situated in a center console of the vehicle, then the driver's gestures may be distinguished from those of a front passenger by whether the gestures are performed using a right or a left hand, it being assumed that the driver and the front passenger respectively use the hand closest to the center console for operation. In sensor units that allow for a differentiation between the driver and the front passenger, for example in that different high-frequency signals are transmitted via the body of the driver and of the front passenger, which are used by the sensor units for detecting the position of the body part, a distinction of gestures of the front passenger and of the driver is possible on the basis of the information of the sensor unit. If a distinction is possible, then different control intentions or different representation functions or adaptation functions for the driver and for the front passenger may be assigned to the same gesture.

What is claimed is:
1. A method for operating an interactive control device, the control device including a display device configured to represent information including control elements, comprising:
ascertaining a control probability based on an ascertained control intention for each of a plurality of control elements represented on the display device, from a movement of a user's body part in relation to the plurality of control elements that does not activate the control elements, wherein the control intention is ascer- tained based on the movement of the user's body part in relation to a respective control element;

ascertaining a control spotlight region corresponding to a portion of the display device encompassing an expected touch position of the user's body part on the display device, wherein the location and size of the control spotlight region is ascertained based on the ascertained control probability for each control element, the size of the control spotlight region being greater than the user's body part and smaller than the display device; and selectively adapting display of the control elements such that (i) each control element which is at least partially within the control spotlight region is proportionally optimized for activation according to the respective ascertained control probability, and (ii) control elements outside the control spotlight region are not proportionally optimized for activation;

wherein the control probability for each control element is ascertained prior to activating a control action;

wherein each control element which is at least partially within the control spotlight region is scaled as a function of at least one of (i) distance from the center of the control spotlight region and (ii) amount of planar overlap with the control spotlight region.

2. The method according to claim 1, wherein the ascertaining of the control spotlight region includes ascertaining whether the user's body part is located within an activation region that is spatially defined relative to a display region of at least one of the control elements on the display device.

3. The method according to claim 1, wherein the ascertaining of the control intention and the adapting of the represented information are performed at least one of (a) iteratively and (b) continuously.

4. The method according to claim 2, wherein the ascertaining of the control spotlight region is based on information relating to at least one of (a) a bodily action, (b) a direction of movement of a body part, and (c) a viewing direction of a user.

5. The method according to claim 1, further comprising ascertaining user information at least partly by at least one of (a) a camera system and (b) an ultrasonic sensor system.

6. The method according to claim 1, wherein the ascertaining of the control intention is based on information from surroundings about a driving situation, which is taken into account when adapting the at least one of the control elements.

7. The method according to claim 1, wherein the adapting includes changing at least one of (a) a transparency, (b) the size of the control element, (c) a distance from adjacent additional control elements and (d) an animation of at least one of (i) the control element and (ii) several control elements.

8. The method according to claim 1, wherein the ascertaining of the control intention includes detecting and evaluating gestures executed by the body part, the adapting of the represented information being performed in accordance with an adaptation function assigned to the detected gesture.

9. The method according to claim 8, wherein the gestures include at least one static gesture, which is detected on the basis of a predefined body part attitude.

10. The method according to claim 8, wherein the gestures include at least one dynamic gesture, which is detected on the basis of a predefined path line traversed by the body part.

11. The method according to claim 8, wherein the gestures include at least one complex gesture, which is detected on the basis of at least one of (a) a transition between predefined static gestures and (b) a static gesture, which traverses a predefined path line.

12. The method according to claim 1, wherein the information represented on the display device is adapted for a representation that is optimized for a visual communication of information if no control intention is ascertained.

13. An interactive control device, comprising:

a display device adapted to represent information that includes control elements; and a control device having at least one processor adapted to ascertain a control probability based on an ascertained control intention for each of a plurality of control elements represented on the display device, from a movement of a user's body part in relation to the plurality of control elements that does not activate the control elements, the control intention ascertained based on the movement of the user's body part, ascertain a control spotlight region corresponding to a portion of the display device encompassing an expected touch position of the user's body part on the display device, wherein the location and size of the control spotlight region is ascertained based on the ascertained control probability for each control element, the size of the control spotlight region being greater than the user's body part and smaller than the display device, and to selectively adapt display of the control elements such that (i) each control element which is at least partially within the control spotlight region is proportionally optimized for activation according to the respective ascertained control probability, and (ii) control elements outside the control spotlight region are not proportionally optimized for activation;

wherein the control probability for each control element is ascertained prior to activating a control action;

wherein each control element which is at least partially within the control spotlight region is scaled as a function of at least one of (i) distance from the center of the control spotlight region and (ii) amount of planar overlap with the control spotlight region.

14. The device according to claim 13, further comprising at least one sensor device adapted to detect the user's body part within an activation region that is spatially defined relative to a display region of at least one of the control elements on the display device in order to ascertain a control intention for at least one of the control elements represented on the display device.

15. The device according to claim 13, wherein the control device is adapted to ascertain the control intention and to adapt the information at least one of (a) iteratively and (b) continuously.

16. The device according to claim 14, wherein sensor information includes information about a bodily action of the user.

17. The device according to claim 13, further comprising at least one of (a) a camera system and (b) an ultrasonic sensor system adapted to ascertain user information.

18. The device according to claim 14, wherein sensor information includes information relating to at least one of (a) a viewing direction of the user and (b) a direction of movement of the user's body part.

19. The device according to claim 14, wherein the control device is adapted to ascertain at least one of (a) a direction of movement of the body part and (b) a viewing direction of the user in accordance with sensor information.

20. The device according to claim 13, wherein the control device is configured to adapt the at least one of the control elements in accordance with information from surroundings about a driving situation.

21. The device according to claim 13, wherein the control device is configured to adapt a transparency by modification at least one of (a) a distance from adjacent additional control elements and (b) an animation of at least one control element.

22. The device according to claim 14, wherein the at least one sensor device is adapted to ascertain sensor information on the basis of at least one of (a) high-frequency signals transmitted via the body of the user and (b) a position of the body part.

23. The device according to claim 14, wherein the at least one sensor device includes a position-resolving touch-sensitive device.

24. The device according to claim 14, wherein at least one sensor device is adapted to detect and evaluate gestures performed by the body part, the control device configured to adapt the represented information in accordance with an adaptation function assigned to the detected gesture.

25. The device according to claim 24, wherein the gestures include at least one static gesture that is detectable by the at least one sensor device as a predefined body part attitude.

26. The device according to claim 24, wherein the gestures include at least one dynamic gesture, which is detectable by the at least one sensor device on the basis of a predefined path line traversed by the body part.

27. The device according to claim 24, wherein the gestures include at least one complex gesture, which is detectable by the at least one sensor device on the basis of at least one of (a) a transition between predefined static gestures and/(b) a static gesture that traverses a predefined path line.

* * * * *